US 8,589,548 B2

(12) United States Patent
Karaoguz et al.

(10) Patent No.: US 8,589,548 B2
(45) Date of Patent: Nov. 19, 2013

(54) REMOTE MANAGEMENT OF TV VIEWING OPTIONS IN A MEDIA EXCHANGE NETWORK

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 2407 days.

(21) Appl. No.: 10/672,864

(22) Filed: Sep. 26, 2003

(65) Prior Publication Data
US 2004/0117852 A1    Jun. 17, 2004

Related U.S. Application Data

(60) Provisional application No. 60/474,531, filed on May 30, 2003, provisional application No. 60/432,472, filed on Dec. 11, 2002, provisional application No. 60/443,894, filed on Jan. 30, 2003.

(51) Int. Cl.
*G06F 15/173* (2006.01)

(52) U.S. Cl.
USPC ........... 709/226; 709/212; 709/217; 709/219; 709/223; 709/230; 725/86; 725/91; 725/98; 725/100; 725/103; 348/207.1

(58) Field of Classification Search
USPC ............ 709/212, 217, 219, 223, 226, 230; 725/86, 91, 98, 100, 103; 348/207.1, 348/208.1
See application file for complete search history.

(56) References Cited

U.S. PATENT DOCUMENTS

| | | | |
|---|---|---|---|
| 5,570,415 A * | 10/1996 | Stretton et al. | 379/110.01 |
| 5,721,815 A * | 2/1998 | Ottesen et al. | 715/721 |
| 5,721,878 A * | 2/1998 | Ottesen et al. | 725/87 |
| 5,917,997 A * | 6/1999 | Bell et al. | 714/4 |
| 5,930,493 A * | 7/1999 | Ottesen et al. | 725/92 |
| 6,233,428 B1 | 5/2001 | Fryer | |
| 6,349,324 B1 * | 2/2002 | Tokoro | 709/200 |
| 6,480,889 B1 * | 11/2002 | Saito et al. | 709/220 |
| 6,643,658 B1 * | 11/2003 | Jai et al. | 707/100 |
| 6,693,896 B1 * | 2/2004 | Utsumi et al. | 370/352 |
| 7,003,795 B2 | 2/2006 | Allen | |

(Continued)

*Primary Examiner* — Liangche A Wang
(74) *Attorney, Agent, or Firm* — Garlick & Markison

(57) ABSTRACT

A system supporting the remote management of options related to media consumption in a media exchange network is disclosed. Such a system may comprise a set top box communicatively coupled to a television display and storage. The set top box may be used for the consumption of media via a communication network. In such an embodiment, server software may enable the remote modification, via a communication network, of options related to the consumption of media by a user of the set top box. The media consumed may be one or more of digital audio, a digital still image, digital video, and digital data. Other aspects of the present invention may be seen in a personal computer monitor and personal computer circuitry, communicatively coupled to a storage and a communication network. An embodiment of the present invention may also enable the modification of TV viewing options via a telephone voice response system.

22 Claims, 15 Drawing Sheets

(56) References Cited

U.S. PATENT DOCUMENTS

| | | |
|---|---|---|
| 7,055,104 B1 * | 5/2006 | Billmaier et al. ............. 715/765 |
| 7,065,778 B1 * | 6/2006 | Lu .................................. 725/98 |
| 7,075,573 B2 * | 7/2006 | Imaeda .................... 348/231.99 |
| 7,080,400 B1 * | 7/2006 | Navar ........................... 725/139 |
| 7,084,994 B1 * | 8/2006 | Koppich et al. .............. 358/1.15 |
| 7,170,546 B1 * | 1/2007 | Pocock ........................... 348/24 |
| 2002/0016971 A1 | 2/2002 | Berezowski |
| 2002/0138842 A1 * | 9/2002 | Chong et al. ..................... 725/87 |
| 2004/0003040 A1 | 1/2004 | Beavers |
| 2007/0174886 A1 * | 7/2007 | Scheuer et al. ................ 725/110 |
| 2007/0198738 A1 * | 8/2007 | Angiolillo et al. ............. 709/231 |

* cited by examiner

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost 59c (without Queuing) | | Showing All Day (48 Min), Earliest Order Time: 4:00PM MPEG-2 1.5 Mbps | | |
| VACATION in ALASKA VIDEO 803 | Express Estimated Delivery Time: 18 min Cost $1.2 (with Queuing) | | Showing All Day (48 Min), Earliest Order Time: 4:00PM MPEG-2 4 Mbps | | |
| VACATION in ALASKA VIDEO 804 | Overnight Delivery: Avail Nxt Morning Cost: 5c (Server Stored) | | Showing All Day (48 Min), Earliest Order Time: 4:00PM MPEG-2 19 Mbps | | |

FIG. 8

REMOTE MANAGEMENT OF TV VIEWING OPTIONS IN A MEDIA EXCHANGE NETWORK

CROSS-REFERENCE TO RELATED APPLICATIONS/INCORPORATION BY REFERENCE

This application makes reference to, claims priority to, and claims the benefit of U.S. Provisional Patent Application No. 60/474,531, entitled "Remote Management Of TV Viewing Options In A Media Exchange Network", filed May 30, 2003, U.S. Provisional Patent Application Ser. No. 60/432,472, entitled "Personal Inter-Home Media Exchange Network", filed Dec. 11, 2002, and U.S. Provisional Patent Application Ser. No. 60/443,894, entitled "Personal Access And Control Of Media Peripherals On A Media Exchange Network", filed Jan. 30, 2003, the complete subject matter of which are hereby incorporated herein by reference, in their entirety.

The applicant hereby incorporates the complete subject matter herein by reference, in its entirety, of U.S. patent application Ser. No. 10/657,390, entitled "Personal Inter-Home Media Exchange Network", filed Sep. 8, 2003, and U.S. patent application Ser. No. 10/660,267, entitled "Personal Access And Control Of Media Peripherals On A Media Exchange Network", filed Sep. 11, 2003.

The applicants hereby incorporate the complete subject matter herein by reference, in their entirety, of U.S. Provisional Patent Application Ser. No. 60/473,696, entitled "Third Party Media Channel Access In A Media Exchange Network", filed on May 28, 2003, and Unites States Provisional Patent Application Ser. No. 60/453,787, entitled "Headend Pre-Processing Media Guide Support For Personal Media Exchange Network", filed on Mar. 11, 2003.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Currently available media streams accessible via, for example, radio, broadcast television, cable television, or direct broadcast satellite television, digital subscriber line (DSL), cable internet service, allow the subscriber limited control over the programming available and the viewing or listening schedule. Program materials are chosen by the broadcaster/service provider, and are transmitted according to a schedule set by the service provider. If a subscriber will not be available to enjoy it at the time of broadcast, they must make plans in advance to record the material(s) of interest. If plans are not made in advance and the subscriber cannot find a means to arrange for the making of a recording, the opportunity to enjoy the programming may be lost. In general, most consumer media recording equipment has no support for the functionality needed to allow remote programming and/or activation.

Broadcast media sources arrive at the subscriber's location whether or not the programming is appropriate for the audience present. Materials intended for more mature audiences may become available to a younger group simply by changing the channel. Some of the equipment used for broadcast/cable/satellite reception supports the lock-out of designated sources or channels. These controls, however, are typically available only via direct access at the location of the equipment. If the addition or removal of access restrictions is needed while the subscriber us away from home (e.g., when the subscriber is away and guests are in the home, the subscriber is at work and the children come home from school early, or a spouse/partner is unable to make the adjustment), there is no means to remotely adjust media access controls.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a system supporting the remote management of options related to media consumption. Such a system may comprise a first television display in a first home, and a first storage, in the first home, that stores the media. The first television display may have an associated first set of options governing the consumption of media, and the first storage may support consumption of the media by the first television display. In addition, the first storage may have an associated first network address. An embodiment of the present invention may comprise a second television display in a second home, and a second storage, in the second home, that stores the media. The second television display may have an associated second set of options governing the consumption of media, and the second storage may support consumption of the media by the second television display. The second storage may also have an associated second network address. In addition, an embodiment of the present invention may comprise server software that receives, via a communication network, a request that identifies at least one of the associated first and second network addresses, a user identifier, and authorization information. The server software may respond by identifying the other of the associated first and second network addresses, to support management of one of the associated first and second sets of options governing the consumption of media.

In an embodiment in accordance with the present invention, the first and second network addresses may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet. The media may comprise at least one of audio, a still image, video, real-time video, and data, and consumption may comprise at least one of playing audio, displaying a still image, displaying video, and displaying data. Each of the associated first and second sets of options governing the consumption of media may comprise at least one of a media schedule, a device address, a device identifier, billing information, tracking information, and channel setup information. Each of the associated first and second sets of options governing the consumption of media program setup information may also comprise digital rights management information, media caching information, media storage information, media filter information, a user profile, and pay-per-view event information.

In an embodiment of the present invention, the media filtering information may comprise at least one of an industry rating, a program time, a language, content information, and a personal program preference. The management in such an embodiment may comprise at least one of observing, setting, modifying, deleting, registering, authenticating, and determining authority. Another embodiment in accordance with the present invention may comprise a telephone voice response system for receiving user input via a telephone network, and having an associated third network address. Such an embodiment may also comprise server software that receives from the telephone voice response system a request that identifies at least one of the associated first, second, and third network addresses, a user identifier, and authorization information. The server software may respond by identifying at least one of the associated first, second, and third network addresses, to support management of one of the associated first and second sets of options governing the consumption of media. The telephone voice response system may recognize at least one of human speech and dual-tone multi-frequency (DTMF) signals, and the server software may function to perform at least one of the storage and delivery of media.

Additional aspects of the present invention may be observed in a system supporting the remote management of options related to media consumption. An embodiment in accordance with the present invention may comprise a television display in a first home, a first storage that stores the media, in the first home, and set top box circuitry, in the first home, communicatively coupled to the first storage to support consumption of media. The first storage may be communicatively coupled to the television display, and may have an associated first set of options governing the consumption of media, and an associated first network address. An embodiment of the present invention may also comprise a personal computer monitor in a second home, and a second storage that stores the media, in the second home. The second storage may be communicatively coupled to the personal computer monitor, and may have an associated second set of options governing the consumption of media, and an associated second network address. Such an embodiment may also comprise personal computer circuitry, in the second home, communicatively coupled to the second storage to support consumption of media.

An embodiment in accordance with the present invention may comprise server software that receives, via a communication network, a request that identifies at least one of the associated first and second network addresses, a user identifier, and authorization information. The server software may respond by identifying the other of the associated first and second network addresses, to support management of one of the associated first and second sets of options governing the consumption of media. The first and second network addresses may be one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. The communication network may be the Internet.

In an embodiment of the present invention, the media may comprise at least one of audio, a still image, video, real-time video, and data, and consumption may comprise at least one of playing audio, displaying a still image, displaying video, and displaying data. Each of the associated first and second sets of options governing the consumption of media may comprise at least one of a media schedule, a device address, a device identifier, billing information, tracking information. Each of the associated first and second sets of options governing the consumption of media may also comprise channel setup information, program setup information, digital rights management information, media caching information, media storage information, media filter information, a user profile, and pay-per-view event information. The media filtering information may comprise at least one of an industry rating, a program time, a language, content information, and a personal program preference. The management may comprise at least one of observing, setting, modifying, deleting, registering, authenticating, and determining authority.

Yet another embodiment of the present invention may comprise a telephone voice response system for receiving user input via a telephone network, having an associated third network address. Such an embodiment may comprise server software. The server software may receive from the telephone voice response system a request that identifies at least one of the associated first, second, and third network addresses, a user identifier, and authorization information. The server software may respond by identifying at least one of the associated first, second, and third network addresses, to support management of one of the associated first and second sets of options governing the consumption of media. The telephone voice response system may recognize at least one of human speech and dual-tone multi-frequency (DTMF) signals, and the server software may function to perform at least one of the storage and delivery of media.

Further aspects of the present invention may be seen in a system supporting the remote management of options related to media consumption. An embodiment in accordance with the present invention may comprise a storage for storing media, and set top box circuitry supporting the consumption of media via a communication network. The set top box may be communicatively coupled to the storage, and may have an associated set of options governing the consumption of media. Such an embodiment may also comprise a telephone voice response system for receiving user input via a telephone network, and server software that receives from the telephone voice response system a request. The server software may respond by enabling the management of the associated set of options governing the consumption of media. The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

DETAILED DESCRIPTION OF THE INVENTION

Certain embodiments of the present invention relate to user management of media viewing options. In particular, certain embodiments of the present invention relate to the remote management of viewing options for TV viewing via a media exchange network.

Figure 1A:
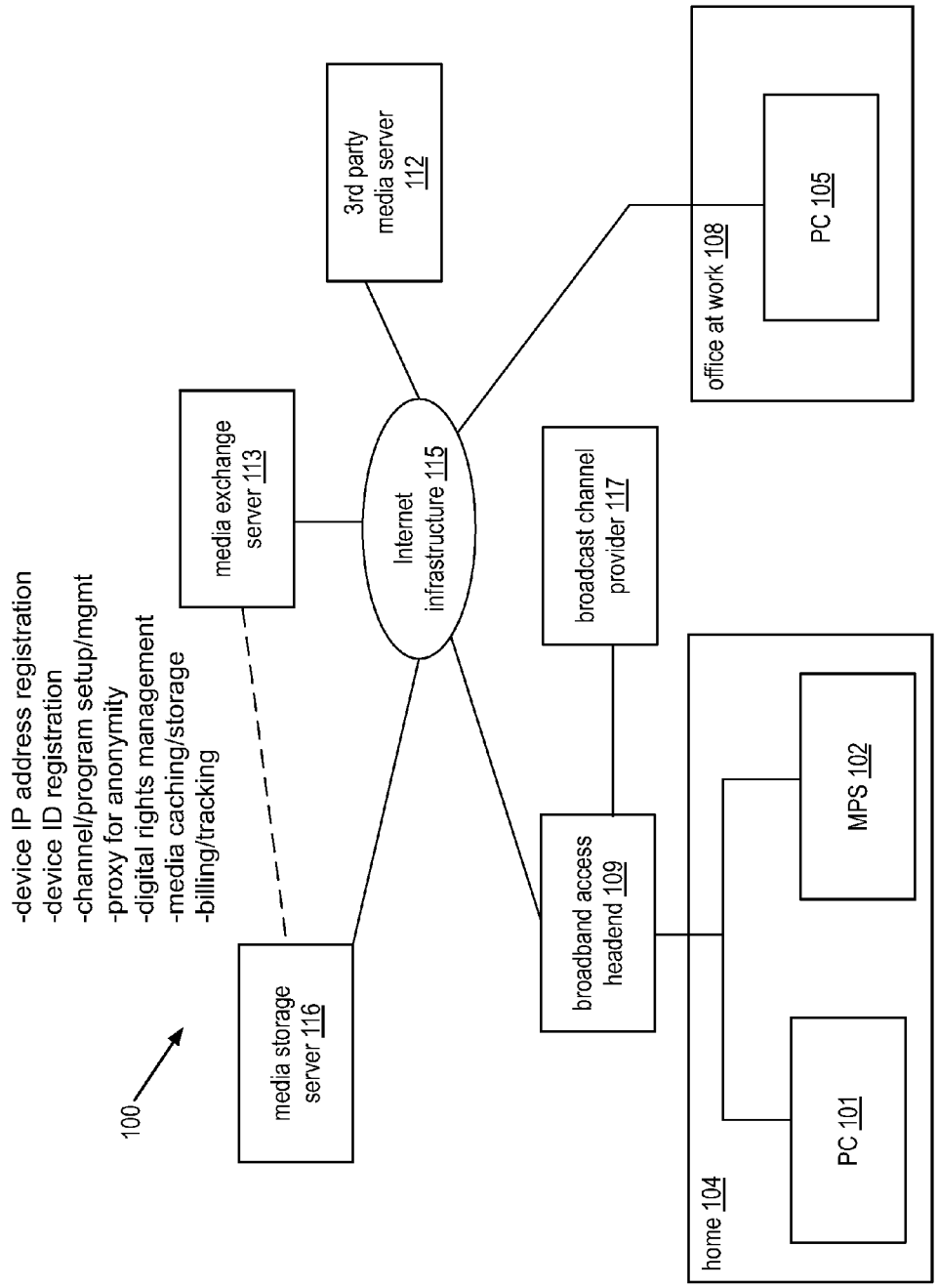
FIG. 1A is a diagram illustrating an embodiment of a media exchange network supporting remote management of TV viewing options, in accordance with various aspects of the present invention.

FIG. 1A is a diagram illustrating an embodiment of a media exchange network 100 supporting remote management of TV viewing options, in accordance with various aspects of the present invention. Specifically, the media exchange network 100 is a communication network comprising a PC 101 and a MPS (media processing system) 102 at a user's home 104 and a PC 105 at a user's office at work 108. The PC 101 and the MPS 102 interface to a broadband access headend 109. The broadband access headend 109 may comprise a cable headend, a satellite headend, or a DSL headend, in accordance with various embodiments of the present invention. The PC 101 and the MPS 102 may include internal modems (e.g., a cable modem or DSL modem) or other interface devices in order to communicate with the broadband access headend 109. Optionally, the interface device (e.g., modem) may be external to the PC 101 and the MPS 102. The PC 105 may interface directly to the Internet infrastructure 115 via, for example, a dial-up connection over telephone lines. In various other embodiments, a MPS or PC such as, for example, MPS 102 and PC's 101, 105 may participate in media exchange network 100 using a satellite network infrastructure, a digital subscriber line (DSL) infrastructure, an Internet infrastructure, an intranet infrastructure, a wired infrastructure, and a wireless infrastructure.

The media exchange network 100 further comprises a $3^{rd}$ party media server 112 and a media exchange server 113 (as in the case of a single central server supporting the media exchange network 100). The broadband access headend 109, the $3^{rd}$ party media server 112, and the media exchange server 113 all connect to the Internet infrastructure 115. An embodiment of the present invention may comprise more than two media exchange servers strategically located at various points in the media exchange network 100. The various entities within the media exchange network 100 may be identified using a network or protocol address such as, for example, an Internet protocol (IP) address, a media access control (MAC) address, and an electronic serial number (ESN).

The media exchange server 113 provides functionality on the media exchange network 100 including, for example, device IP address registration, device ID registration, channel/program setup and management, serving as a proxy for anonymity, digital rights management, media caching/storage, and billing/tracking. In accordance with various embodiments of the present invention, the media exchange server 113 may comprise a single central server or may comprise many distributed elements throughout the media exchange network 100.

The $3^{rd}$ party media server 112 may comprise any of a number of providers of digital media including an on-demand movie provider, an advertiser, and an on-demand music provider. Although the term "viewing" is used in this application, the present invention is not limited to visual consumption of media, and applies equally to the consumption of other digital media such, as, for example, digital audio, and digital data. The term "viewing" is used herein to refer to the consumption of a variety of digital media. The $3^{rd}$ party media server 112 may store movies, video, user profiles, and other digital media that may be provided to users of the media exchange network 100.

The media exchange network 100 may also comprise a media storage server 116 coupled to the Internet infrastructure 115, and a broadcast channel provider 117 interfaced to broadband access headend 109. The media storage server 116 interacts with the media exchange server 113 and provides temporary and/or archival storage for digital media on the media exchange network 100. For example, the media storage server 116 may temporarily hold media files that are addressed to certain MPS's and/or PC's on the media exchange network 100 if those devices are currently turned off or are off-line for some reason. Once a device actively comes on line (i.e., is turned on and connected to the media exchange network), the media may be forwarded to the device. The broadcast channel provider 117 provides broadcast program channel content such as, for example, over-the-air and cable TV channels.

In accordance with an alternative embodiment of the present invention, a broadband access headend may be upgraded to a media exchange headend by adding functionality to facilitate the exchange of media on the media exchange network in conjunction with the media exchange server. Such functionality may include distributed networking capability, archival functionality (long term media storage), temporary storage (to aid in the distribution and routing of media), storage management, and digital rights management.

The various elements of the media exchange network 100 include storage locations for digital media and data. The storage locations may comprise, for example, hard disk drives, a DVD player, a CD player, floppy disk drives, RAM, or any combination of these. The storage locations may also include, for example, memory sticks, PCMCIA cards, compact flash cards, or any combination of these.

The PC's (101 and 105) may comprise desktop PC's, notebook PC's, PDA's, or any computing device.

The MPS 102 is essentially an enhanced set-top-box. The MPS 102 may include a TV screen for viewing and interacting with various user interfaces, media, data, and services that are available on the media exchange network using, for example, a remote control. The PC 101 may include a PC monitor for viewing and interacting with various user interfaces, media, data, and services that are available on the media exchange network using, for example, a keyboard and mouse. The MPS 102 and PC 101 include functional software to support interaction on the media exchange network 100, in accordance with various embodiments of the present invention.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

Other embodiments of the present invention may comprise various combinations and/or multiple instantiations of the elements of FIG. 1A, in accordance with various aspects of the present invention, including media peripheral devices such as, for example, digital cameras, digital camcorders, MP3 players, etc.

In the illustration of FIG. 1A, the user of MPS 102 may access various viewing options directly through the MPS 102. This may include, for example, the customization of personal media channel schedule information, media channel filter information (e.g., parental controls and program content preferences), and the scheduling of pay-per-view events. This may be accomplished via the MPS 102 using, for example, a remote control. These customizations may also be performed by the user via the PC 101 using a keyboard and mouse.

During those times when the user is away from home 104 and does not have access to either the PC 101 or the MPS 102, an embodiment of the present invention permits the user to perform remote customization of all of the options available while at home 104. For example, in the embodiment illustrated in FIG. 1A, the user may employ the PC 105 at their office at work 108 to access the media channel schedule, media guide information, etc. for the MPS 102 using the Internet infrastructure 115 and the broadband access headend 109. The user may also use the PC 105 to subscribe to broadcast services from the broadcast channel provider 117, or $3^{rd}$ party media services from the $3^{rd}$ party media server 112. An example of a system and method for providing access to $3^{rd}$ party media sources may be found in U.S. Provisional Patent Application Ser. No. 60/473,696, filed May 28, 2003, the subject matter of which is hereby incorporated herein by reference in its entirety.

Figure 1B:
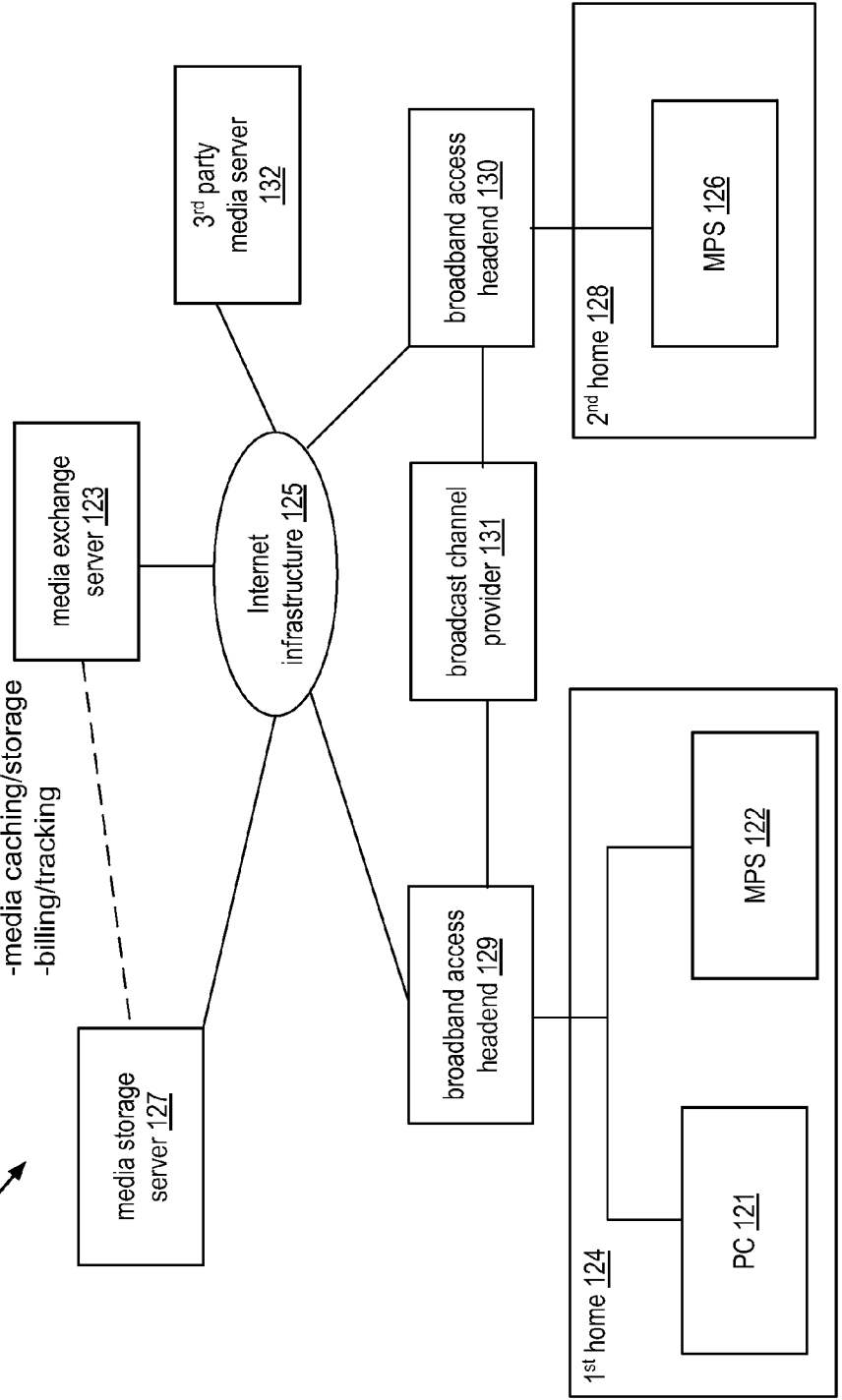
FIG. 1B is a diagram illustrating another embodiment of a media exchange network supporting remote management of TV viewing options, in accordance with various aspects of the present invention.

FIG. 1B is a diagram illustrating another embodiment of a media exchange network supporting remote management of TV viewing options, in accordance with various aspects of the present invention. The embodiment illustrated in FIG. 1B is similar in nature to the media exchange network 100 of FIG. 1A, with the exception that FIG. 1B includes a 2nd MPS 126 located at a 2nd home 128, in place of the PC 105 at user's office at work 108. This substitution in the media exchange network 120 of FIG. 1B does not in any way represent a limitation of the present invention, but is made for illustrative purposes only. One or more MPS's and PC's may be present in a media exchange network, in accordance with present invention.

In the illustration of FIG. 1B, the user of the MPS 122 at the $1^{st}$ home 124 may be temporarily located at the $2^{nd}$ home 128. The $2^{nd}$ home 128 is shown as being equipped with a MPS 126 that is connected to broadband access headend 130. Broadband access headend 130 provides connectivity to Internet infrastructure 125, which provides access to the media exchange network elements previously described with respect to media exchange network 120 of FIG. 1A.

Referring to FIG. 1B, the user of the MPS 126 may, with appropriate authorization and authentication, access all of the various viewing options of the MPS 122 located at the $1^{st}$ home 124, through the TV screen (not shown) and remote control (not shown) connected to the MPS 126 located at the $2^{nd}$ home 128. This may include, for example, the customization of personal media channel schedule information, media channel filter information (e.g., parental controls and program content preferences), and the scheduling of pay-per-view events. The information defining these options may reside, for example, on the MPS 122, the media exchange server 123, or on broadcast access headend 129. In establishing a set of viewing options, the user may use the MPS 126 to access, for example, broadcast channel provider 131 via broadband access head 130, or $3^{rd}$ party media provider 132 via broadband access head 130 and Internet infrastructure 125.

Figure 1C:
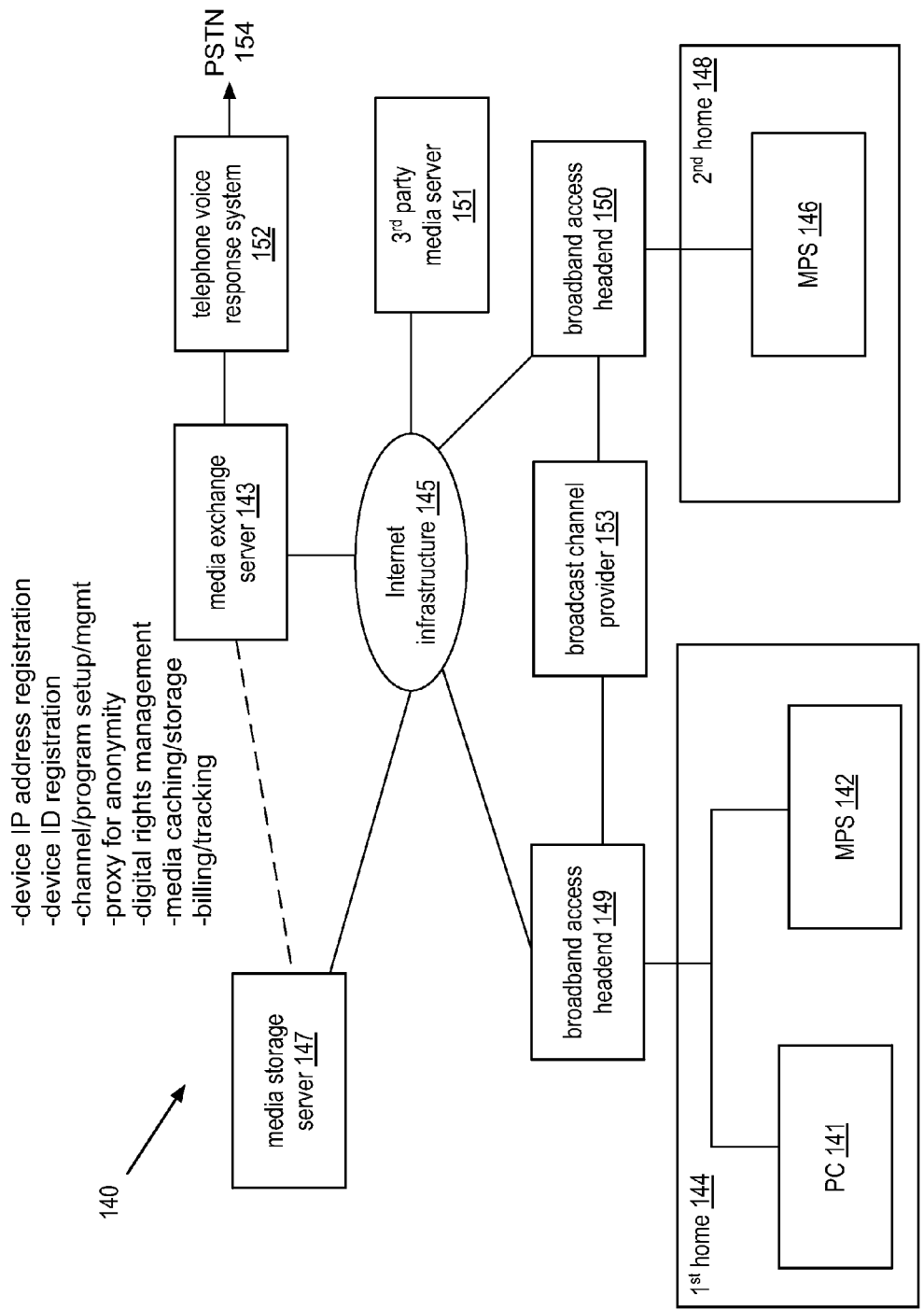
FIG. 1C is a diagram of yet another embodiment of a media exchange network, in accordance with the present invention.

FIG. 1C is a diagram of yet another embodiment of a media exchange network, in accordance with the present invention. The embodiment illustrated in FIG. 1C has an architecture similar to the media exchange network 100 of FIG. 1A or 120 of FIG. 1B. In this example, however, the media exchange network of FIG. 1C includes a telephone voice response system 152 coupled to media exchange server 143. As in FIGS. 1A and 1B, media exchange server 143 has access to, for example, broadband access headends 149 and 150 and $3^{rd}$ party media server 151, via Internet infrastructure 145, and broadcast channel provider 153, via Internet infrastructure 145 and broadband access headends 149 or 150. The telephone voice response system 152 operates to receive speech and dual-tone multi-frequency (DTMF) signals from, and to transmit synthesized speech to public switched telephone network (PSTN) 154. The inclusion of telephone voice response system 152 in the media exchange network 140 enables a user to have telephony access to the media exchange network 140, and to remotely access the MPS 142, using voice commands or telephone dial pad key presses from any telephone available throughout PSTN 154. Using telephone voice response system 152, the user of MPS 142 may access and modify the same complement of the TV viewing options accessible using the MPS 142. This may include, for example, the customization of personal media channel schedule and media channel filter information (e.g., parental controls (e.g., industry ratings, program times, language, and content) and personal program preferences), and the scheduling of pay-per-view events.

Figure 2A:
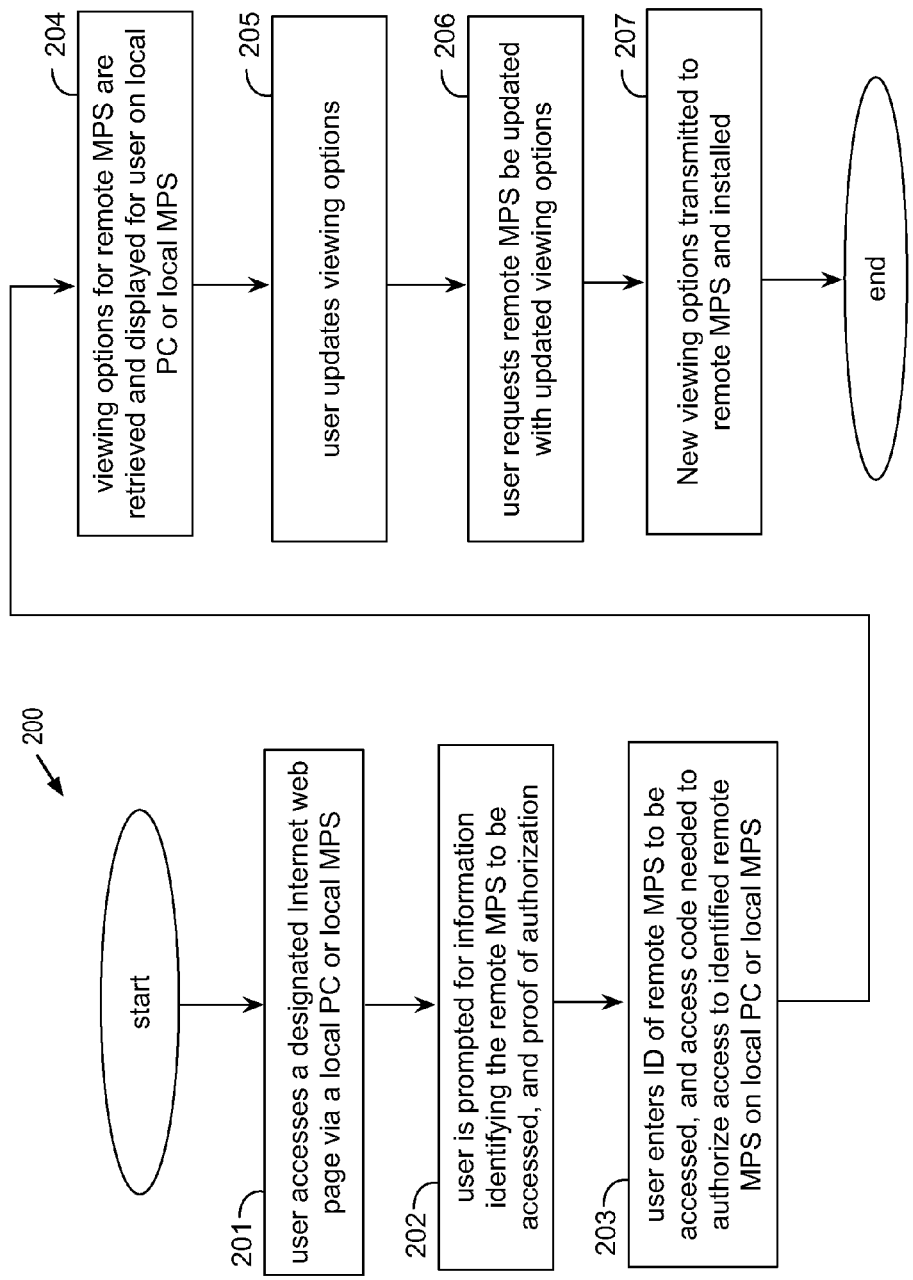
FIG. 2A is a flowchart illustrating a method of remotely managing TV viewing options using an embodiment of a media exchange network such as the media exchange network of FIG. 1A, in accordance with the present invention.

FIG. 2A is a flowchart illustrating a method of remotely managing TV viewing options using an embodiment of a media exchange network such as the media exchange network 100 of FIG. 1A, in accordance with the present invention. The process of updating the viewing options begins when a user accesses a predetermined intranet or Internet web address using a MPS such as the MPS 102 of FIG. 1A, or a PC, such as the PC 105 of FIG. 1A (step 201). Upon accessing the web page, the user is visually prompted to enter information identifying the remote MPS to be accessed, and an access code as proof of authority for the access (step 202). The user then enters the information identifying the remote MPS, and the access code previously assigned (step 203). The available viewing options are then retrieved from, for example, the identified remote MPS, or from a media exchange server such as the media exchange server 113 of FIG. 1A, or from a broadband access headend such as broadband access headend 109 of FIG. 1A. The retrieved viewing options are then displayed for the user on the local MPS or local PC (step 204). At this point, the user may review the available viewing options and update those that require modification (step 205). When finished, the user requests that the updated viewing options be saved for use by the remote MPS (step 206). The updated viewing options are then stored for subsequent access in updating the operation of the remote MPS (step 207).

Figure 2B:
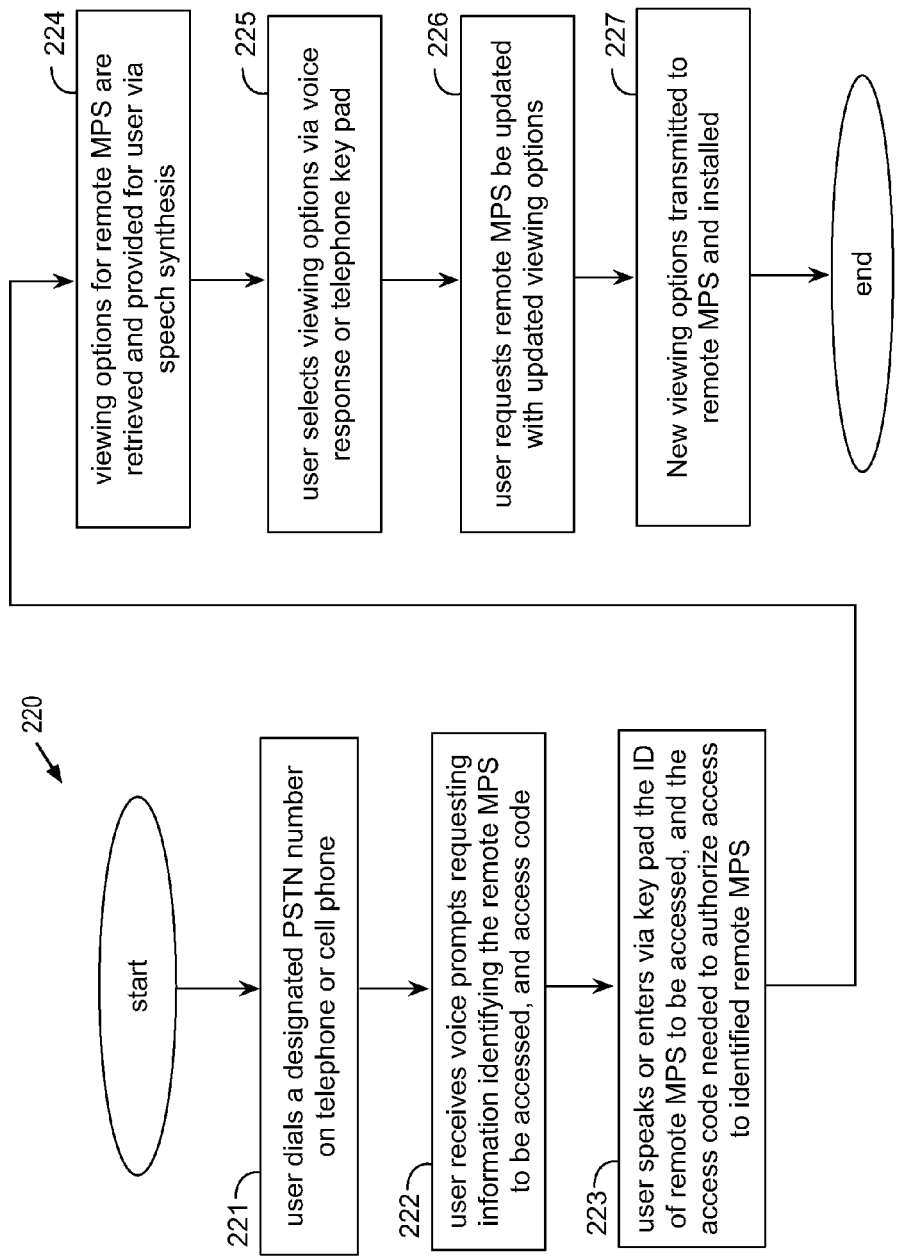
FIG. 2B is a flowchart illustrating another method of remotely managing TV viewing options using an embodiment of a media exchange network such as the media exchange network of FIG. 1C, in accordance with the present invention.

FIG. 2B is a flowchart illustrating another method of remotely managing TV viewing options using an embodiment of a media exchange network such as the media exchange network 140 of FIG. 1C, in accordance with the present invention. The process of updating the viewing options within media exchange network 140 is similar to that described in FIG. 2A for the media exchange network 100 of FIG. 1A. In the flowchart shown in FIG. 2B, the remote management of viewing options begins when a user dials a designated PSTN telephone number using, for example, a wired telephone or cell phone (step 221). Upon completion of the telephone connection, the user is provided with speech prompts requesting that he/she enter information identifying the remote MPS to be accessed, and an access code as proof of authority for the access (step 222). The user then speaks the ID and access code, or uses the key pad of the telephone or cell phone to enter it manually (step 223). The current viewing options for the identified remote MPS are then retrieved and are played back to the user via the telephone or cell phone handset using synthesized speech (step 224). The user may then update those that require modification using spoken responses or dial pad key presses (step 225). When finished, the user requests that the updated viewing options be installed on the remote MPS (step 226). The updated viewing options are then stored for subsequent access in updating the remote MPS (step 227).

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
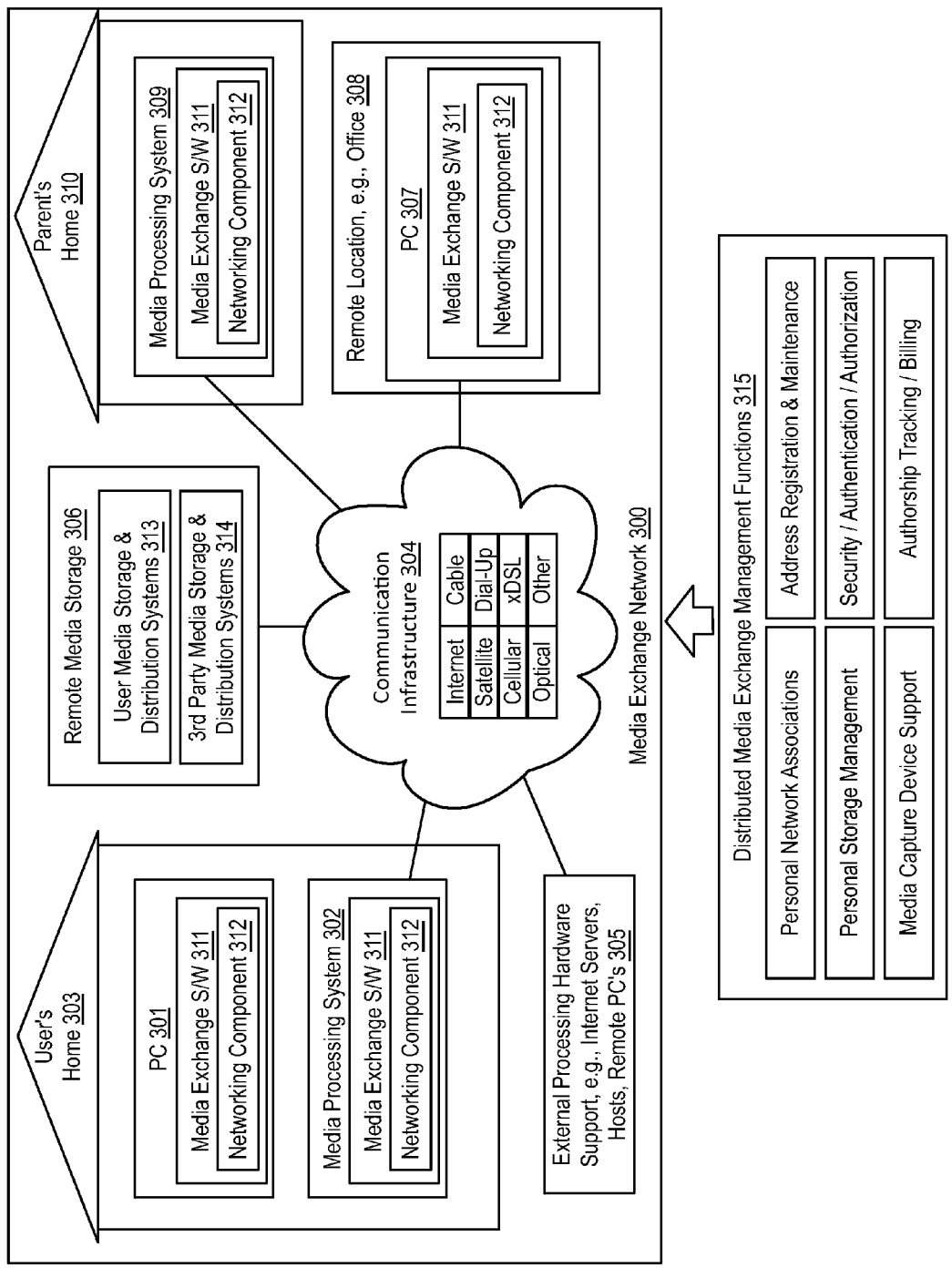
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
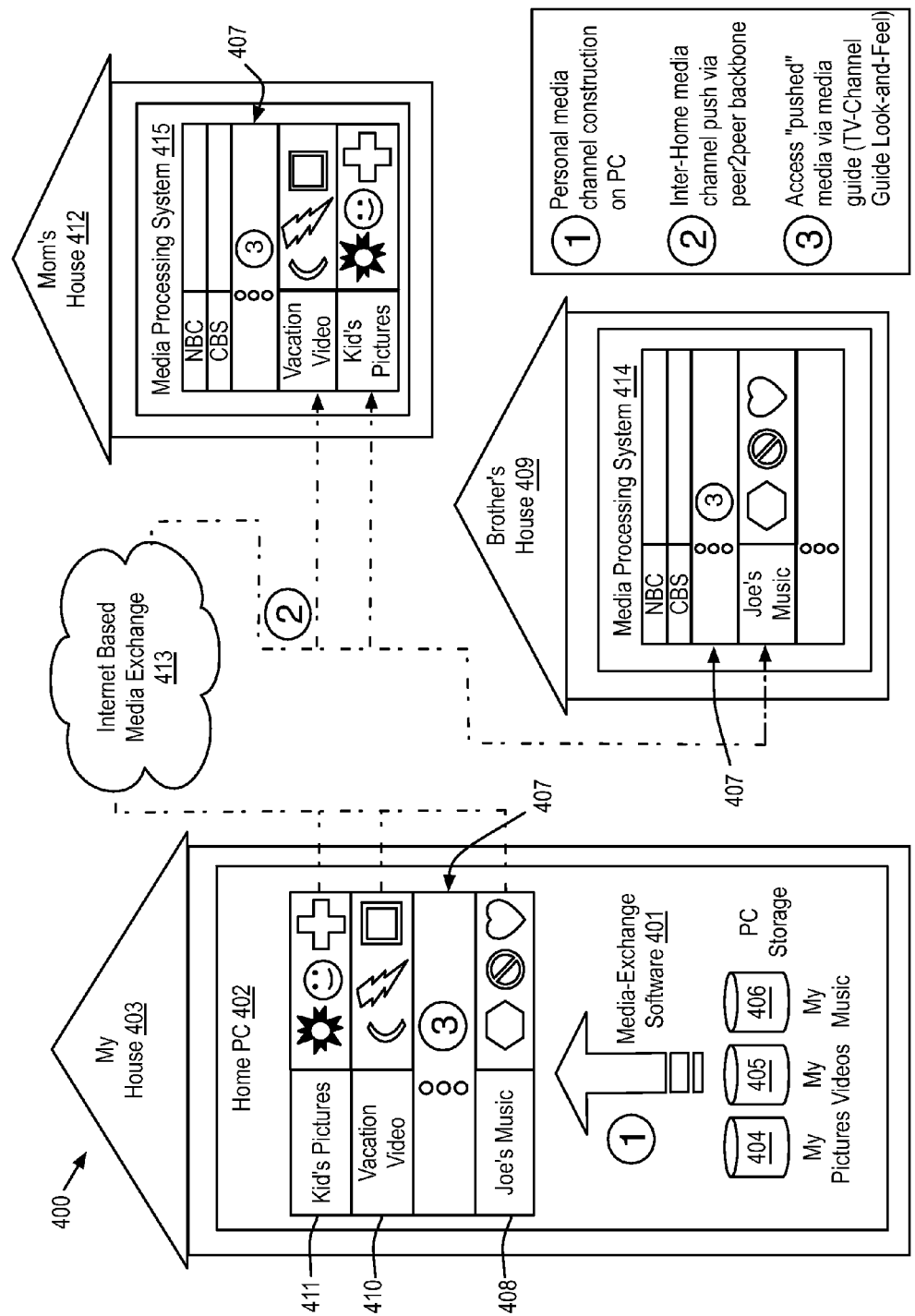
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
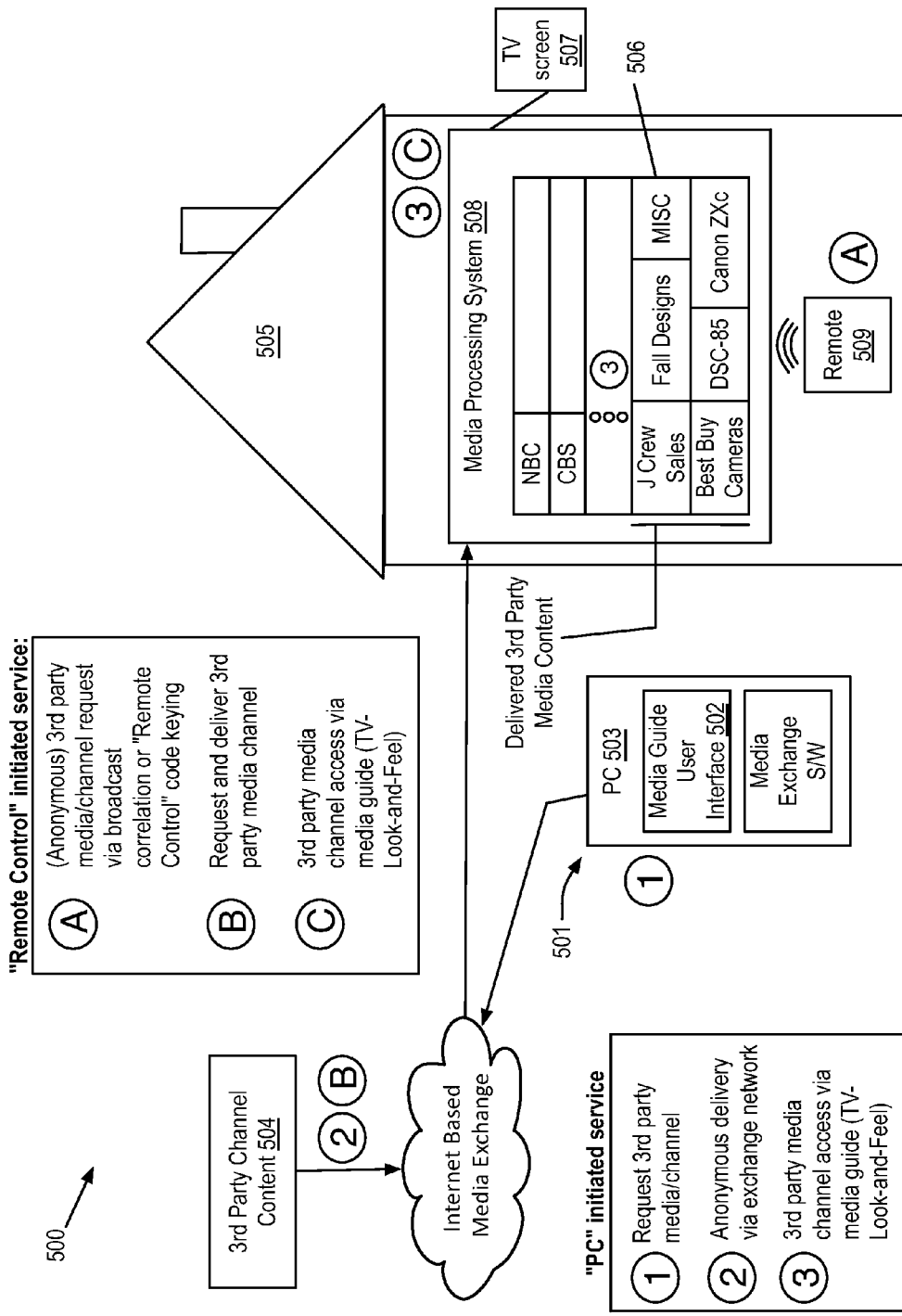
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
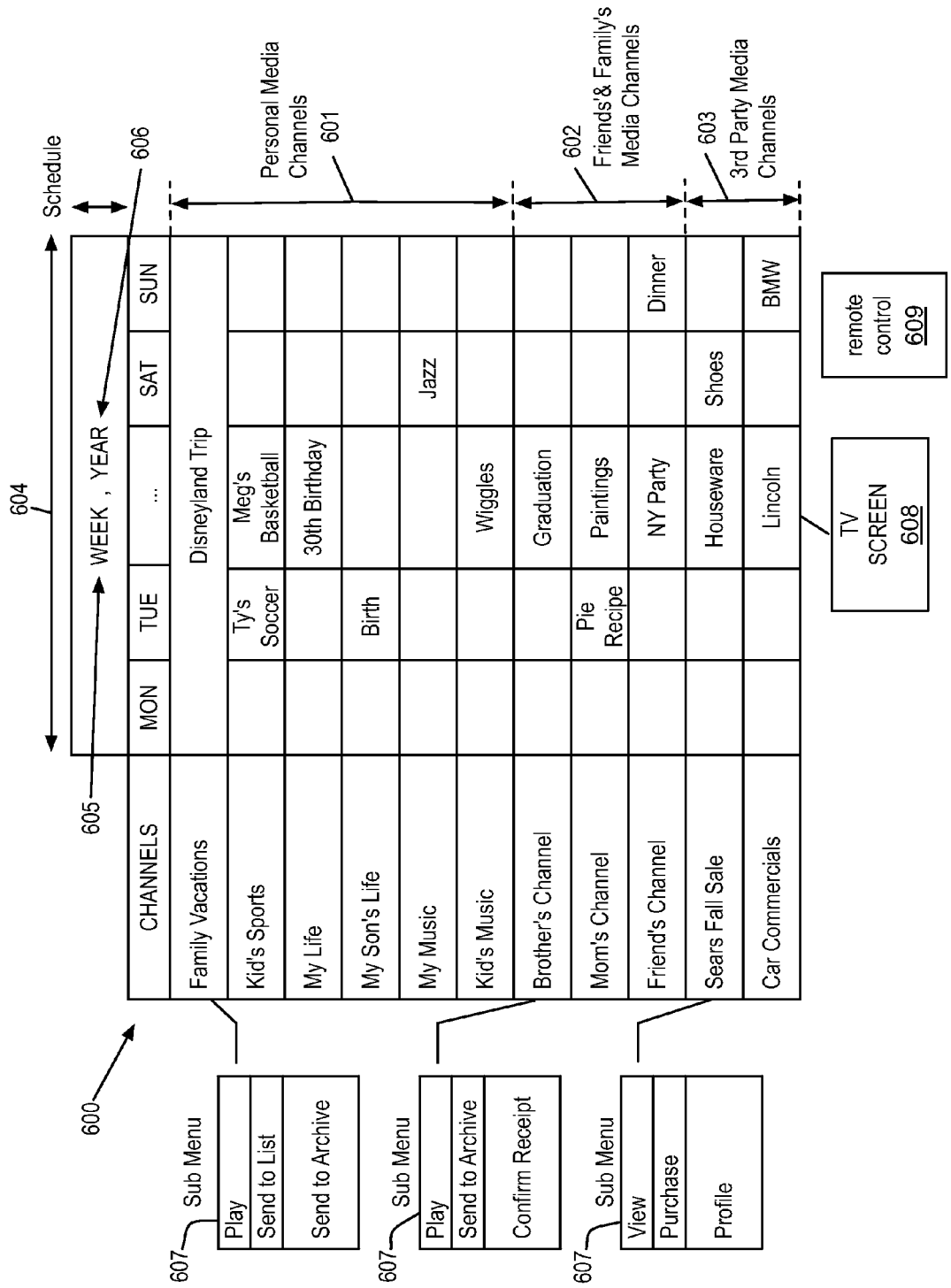
FIG. 6 is an exemplary illustration of a TV guide channel user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
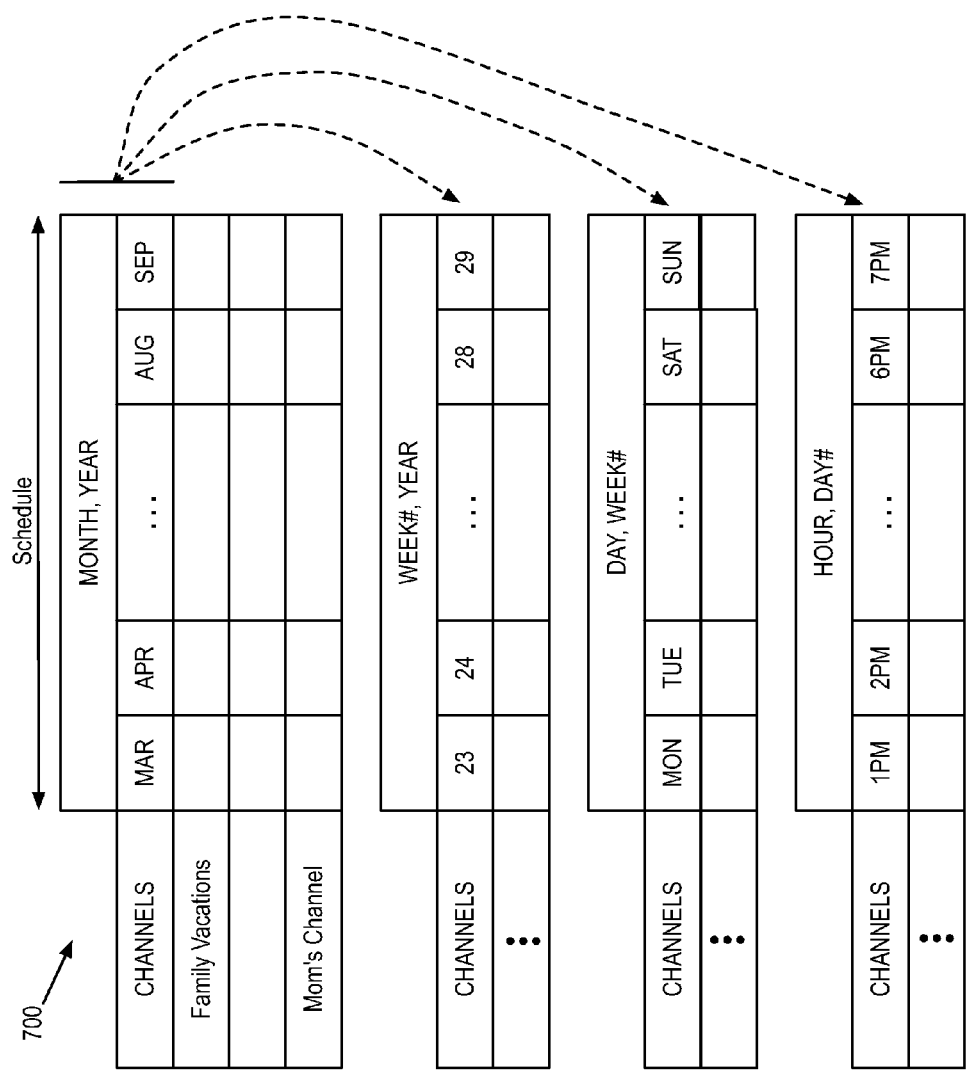
FIG. 7 is an exemplary illustration of several instantiations of a TV guide channel user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
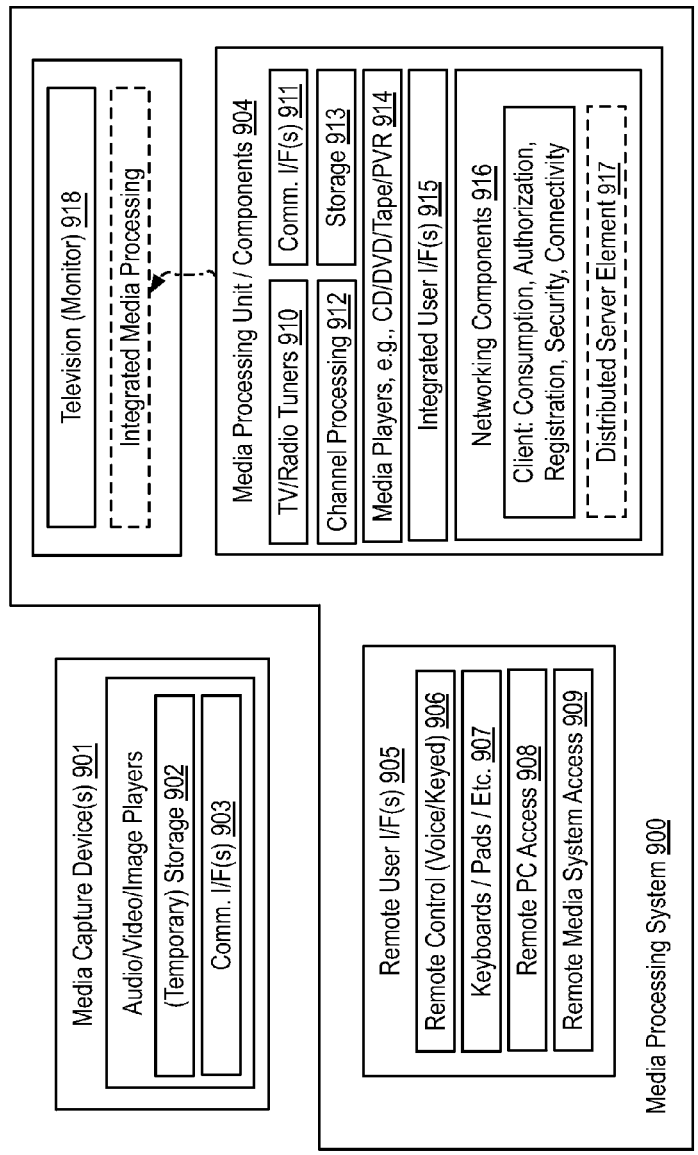
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
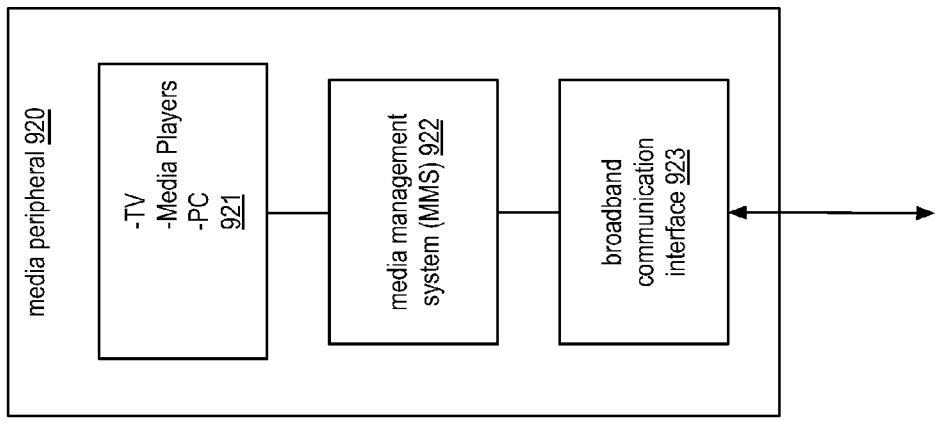
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
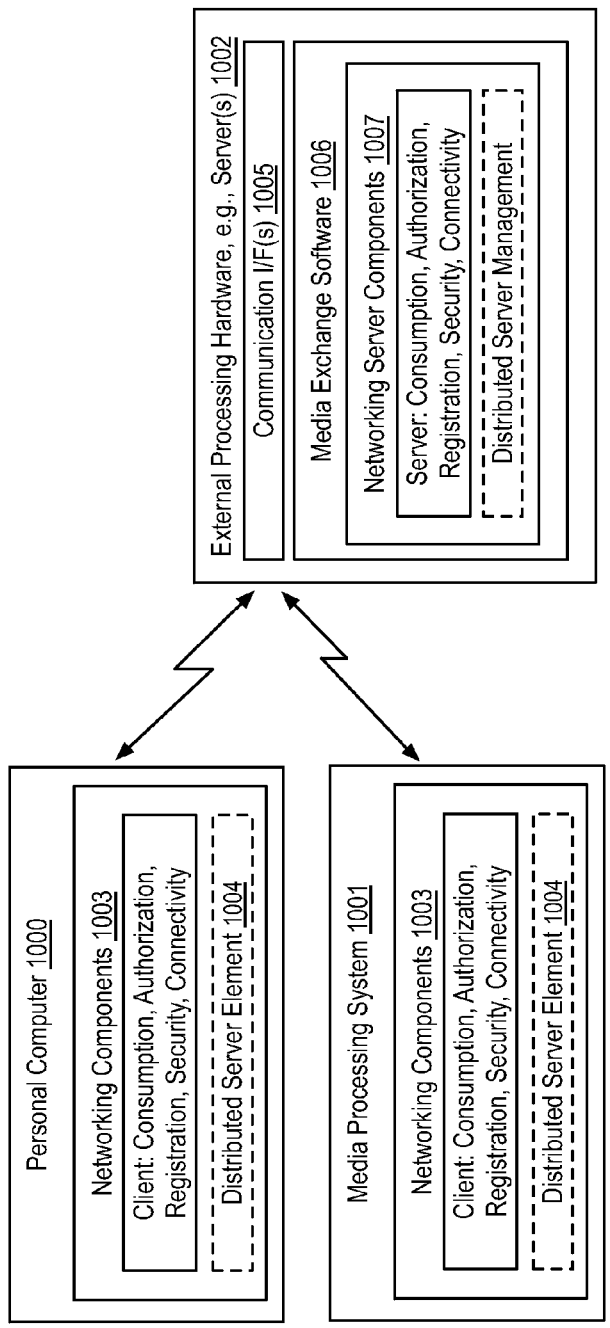
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
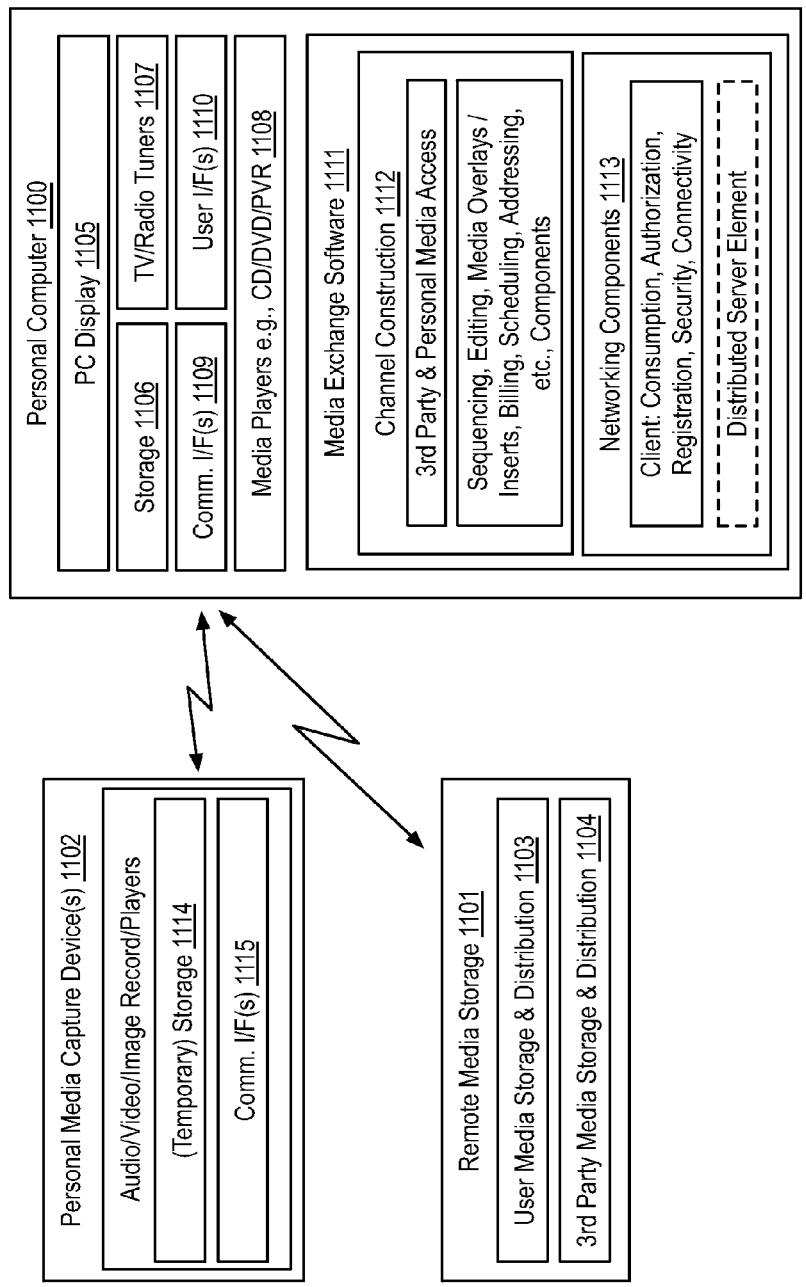
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

The various embodiments of the present invention include a system and method that provide for remote management of TV viewing options in a media exchange network.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A system supporting the remote management of options related to media consumption, the system comprising:
    a first television device at a first location, in which the first television device includes a media management software to provide options to select consumption of media on the first television device;
    a media storage, at the first location, that stores the media and coupled to provide the media to the first television device, wherein the first television device and the media storage are operable to couple to a network;
    a second television device at a second location, wherein the second television device is operable to couple to the network and for a user to initiate an access of the options that select the consumption of the media on the first television device; and server software that is accessible by the user at the second television device for the second television device to access, via the network, the options that select the consumption of the media on the first television device and to remotely select the options from the second location for the consumption of the media at the first television device, the server software includes an user identifier of the user, in which the user initiates the access of the options that select the consumption of the media on the first television device by entering the user identifier at the second location.

2. The system of claim 1, wherein the network comprises a cable infrastructure, a satellite network infrastructure, a digital subscriber line (DSL) infrastructure, an Internet infrastructure, an intranet infrastructure, a wired infrastructure, or a wireless infrastructure, or a combination thereof.

3. The system of claim 1, wherein Internet forms the network.

4. The system of claim 1, wherein the media to be consumed comprises audio, a still image, video, real-time video, or data, or a combination thereof.

5. The system of claim 1, wherein the consumption of the media by the first television device comprises playing audio, displaying a still image, displaying video, or displaying data, or a combination thereof.

6. The system of claim 1, wherein the options selected for the consumption of the media comprise a media schedule, a device address, a device identifier, billing information, tracking information, channel setup information, program setup information, digital rights management information, media caching information, media storage information, media filter information, a user profile, or pay-per-view event information, or a combination thereof.

7. The system of claim 6, wherein the media filter information comprises an industry rating, a program time, a language, content information, or a personal program preference, or a combination thereof.

8. The system of claim 1, wherein the options selected for the consumption of the media comprise accessing the media management software.

9. The system of claim 1, wherein the server software is responsive for receiving user input via a telephone network to initiate the access of the options that select the consumption of the media on the first television device.

10. The system of claim 9, wherein the server software is configured to be responsive to human speech or dual-tone multi-frequency (DTMF) signals or both.

11. The system of claim 1, wherein the server software is configured to deliver the media selected by the options to the first television device.

12. A system supporting the remote management of options related to media consumption, the system comprising:

a set top box at a first location configured for displaying media on a television display, in which the set top box includes a media management software to provide options to select consumption of media on the television display;

a media storage, at the first location, that stores the media and coupled to provide the media to the television display, wherein the set top box and the media storage are operable to couple to a network;

a television device at a second location, wherein the television device is operable to couple to the network and for a user to initiate an access of the options that select the consumption of the media for the set top box on the television display; and server software that is accessible by the user at the television device at the second location for the television device to access, via the network, the options that select the consumption of the media on the television display and to remotely select the options from the second location for the consumption of the media by the television display, the server software includes an user identifier of the user, in which the user initiates the access of the options that select the consumption of the media on the television display by entering the user identifier at the second location.

13. The system of claim 12, wherein the network comprises a cable infrastructure, a satellite network infrastructure, a digital subscriber line (DSL) infrastructure, an Internet infrastructure, an intranet infrastructure, a wired infrastructure, or a wireless infrastructure, or a combination thereof.

14. The system of claim 12, wherein Internet forms the network.

15. The system of claim 12, wherein the media to be consumed comprises audio, a still image, video, real-time video, or data, or a combination thereof.

16. The system of claim 12, wherein the consumption of the media by the television display comprises playing audio, displaying a still image, displaying video, or displaying data, or a combination thereof.

17. The system of claim 12, wherein the options selected for the consumption of the media comprise a media schedule, a device address, a device identifier, billing information, tracking information, channel setup information, program setup information, digital rights management information, media caching information, media storage information, media filter information, a user profile, or pay-per-view event information, or a combination thereof.

18. The system of claim 17, wherein the media filter information comprises an industry rating, a program time, a language, content information, or a personal program preference, or a combination thereof.

19. The system of claim 12, wherein the options selected for the consumption of the media comprise accessing the media management software.

20. The system of claim 12, wherein the server software is responsive for receiving user input via a telephone network to initiate the access of the options that select the consumption of the media on the television display.

21. The system of claim 20, wherein the server software is configured to be responsive to human speech or dual-tone multi-frequency (DTMF) signals or both.

22. The system of claim 12, wherein the server software is configured to deliver the media selected by the options to the set top box.

* * * * *